US008869095B2

(12) United States Patent
Long et al.

(10) Patent No.: US 8,869,095 B2
(45) Date of Patent: Oct. 21, 2014

(54) SOFTWARE FRAMEWORK AND DEVELOPMENT PLATFORM FOR MULTI-SENSOR SYSTEMS

(75) Inventors: Kent D. Long, Orinda, CA (US); Paul A. Iannacito, Hercues, CA (US); John Logan, Danville, CA (US); Adrian Woolley, Pleasanton, CA (US)

(73) Assignee: Atmel Corporation, San Jose, CA (US)

( * ) Notice: Subject to any disclaimer, the term of this patent is extended or adjusted under 35 U.S.C. 154(b) by 149 days.

(21) Appl. No.: 13/109,952

(22) Filed: May 17, 2011

(65) Prior Publication Data

US 2012/0151432 A1   Jun. 14, 2012

Related U.S. Application Data

(60) Provisional application No. 61/422,084, filed on Dec. 10, 2010.

(51) Int. Cl.
| G05B 11/01 | (2006.01) |
| G10L 15/00 | (2013.01) |
| G06F 15/18 | (2006.01) |
| G06F 15/00 | (2006.01) |
| G06F 15/177 | (2006.01) |
| G06F 1/00 | (2006.01) |
| G06F 3/048 | (2013.01) |
| G06F 9/44 | (2006.01) |
| G06F 9/46 | (2006.01) |
| G06F 3/00 | (2006.01) |
| G08B 1/08 | (2006.01) |

(52) U.S. Cl.
CPC ...................................... *G06F 8/30* (2013.01)
USPC ............... 717/100; 700/19; 704/231; 706/20; 706/62; 709/220; 713/300; 715/772; 715/863; 717/101; 717/107; 718/100; 719/313; 340/539.22

(58) Field of Classification Search
CPC ............... G01F 8/00; G01F 8/36; G01F 8/61; G01F 11/30; G01F 1/183; G01F 8/51; G01F 11/3031; G01F 11/3058; G01F 11/3072; G01F 11/3089
See application file for complete search history.

(56) References Cited

U.S. PATENT DOCUMENTS

| 6,144,954 | A | * | 11/2000 | Li ..................................... 706/62 |
| 7,895,257 | B2 | * | 2/2011 | Helal et al. .................... 718/100 |
| 2004/0006761 | A1 | * | 1/2004 | Anand et al. .................. 717/101 |
| 2007/0078527 | A1 | * | 4/2007 | Gonzalez-Banos et al. ..... 700/19 |
| 2007/0236346 | A1 | * | 10/2007 | Helal et al. ................ 340/539.22 |
| 2008/0005287 | A1 | * | 1/2008 | Harvey et al. ................. 709/220 |
| 2008/0059947 | A1 | * | 3/2008 | Anand et al. .................. 717/107 |
| 2009/0144212 | A1 | * | 6/2009 | Adams ............................ 706/20 |

(Continued)

*Primary Examiner* — Don Wong
*Assistant Examiner* — Anibal Rivera
(74) *Attorney, Agent, or Firm* — Fish & Richardson P.C.

(57) ABSTRACT

The disclosed software framework and development platform facilitates software development for multi-sensor systems. In some implementations, developers can select a sensor board that includes a desired combination of sensor devices. The sensor board can be coupled to a development board that includes a target processor and other circuitry to facilitate development and testing of a system that includes the target processor and the sensors. Various software support tools are provided including an Application Programming Interface (API) that provides API abstractions for software drivers for the sensors on the sensor board. By using the abstractions of the API, a software developer does not have to write code ("glue") to interact with the various software drivers. Additionally, the API provides access to a variety of software library functions for performing data scaling, unit conversion and mathematical functions and algorithms.

14 Claims, 4 Drawing Sheets

(56) References Cited

U.S. PATENT DOCUMENTS

| | | | |
|---|---|---|---|
| 2009/0300379 A1* | 12/2009 | Mian et al. | 713/300 |
| 2010/0299542 A1* | 11/2010 | Westfield et al. | 713/300 |
| 2011/0072441 A1* | 3/2011 | Parks et al. | 719/313 |
| 2011/0098056 A1* | 4/2011 | Rhoads et al. | 715/863 |
| 2011/0131521 A1* | 6/2011 | Cho et al. | 715/772 |
| 2011/0131537 A1* | 6/2011 | Cho et al. | 715/863 |
| 2011/0161076 A1* | 6/2011 | Davis et al. | 704/231 |
| 2011/0167391 A1* | 7/2011 | Momeyer et al. | 715/863 |

* cited by examiner

SOFTWARE FRAMEWORK AND DEVELOPMENT PLATFORM FOR MULTI-SENSOR SYSTEMS

CROSS-REFERENCE TO RELATED APPLICATIONS

This application claims priority to U.S. Provisional Application No. 61/422,084, filed on Dec. 10, 2010, entitled "Software Framework and Development Platform for Multi-Sensor Systems," the entire contents of which are incorporated by reference.

TECHNICAL FIELD

This subject matter is generally related to software development, and more particularly to software frameworks and development platforms for multi-sensor systems.

BACKGROUND

Many modern mobile devices (e.g., smart phones, electronic tablets) include a suite of sensors to support applications that require inertial and environmental sensor data. Inertial data can be provided by onboard accelerometers, gyro sensors and magnetometers. Environment data can be provided by temperature, pressure, proximity and ambient light sensors. Inertial and environmental sensors can be provided as integrated circuit chips by a number of manufacturers. Thus, it is common for a single device to include sensors from a variety of manufacturers. Each sensor can include its own software driver to allow program code running on an application processor (e.g., a microcontroller) to interact with the sensor, such as requesting sensor data or programming the sensor.

Since the sensor device manufacturers sell their devices to many customers, the sensor devices typically provide raw data to allow the customer's software applications to process the raw data as desired. Application developers must perform further processing on the raw data (e.g., scaling and units conversion) which requires additional processing cycles from the application processor.

SUMMARY

The disclosed software framework and development platform facilitates software development for multi-sensor systems. In some implementations, developers can select a sensor board that includes a desired combination of sensor devices. The sensor board can be coupled to a development board that includes a target processor and other circuitry to facilitate development and testing of a system that includes the target processor and the sensors. Various software support tools are provided including an Application Programming Interface (API) that provides API abstractions for software drivers for the sensors. By using the API abstractions, a software developer does not have to write code ("glue") to interact with the various software drivers. Additionally, the API abstractions provide easy access to a variety of software library functions for performing data scaling, unit conversion and mathematical functions and algorithms.

Particular embodiments of the invention can be implemented to realize one or more of the following advantages: 1) rapid and efficient software development for multi-sensor systems, 2) reduced software development costs, and 3) an easy interface to sensors and standard API definition to application software.

DETAILED DESCRIPTION

Exemplary Development Platform

Figure 1:
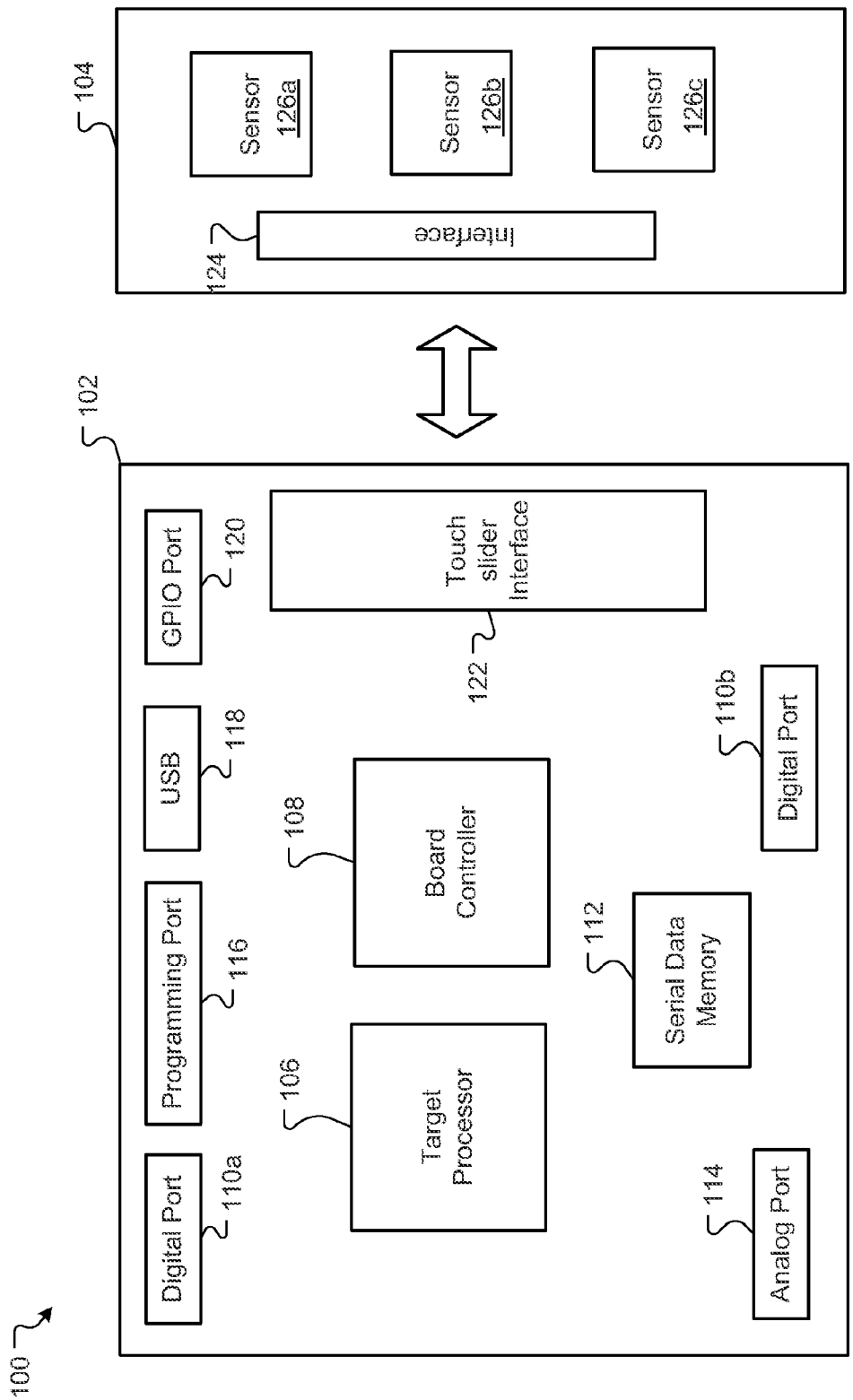
FIG. 1 is a block diagram of an exemplary software development system for developing and testing multi-sensor systems.

FIG. 1 is a block diagram of an exemplary software development system 100 for developing and testing multi-sensor systems. In some implementations, system 100 includes development board 102 and sensor board 104.

Development board 102 can include target processor 106, board controller 108, digital ports 110a-b, data memory 112 (e.g., flash memory), analog port 114, programming port 116, serial port 118 (e.g., USB), general purpose I/O port 120 (GPIO) and touch slider interface 122.

Target processor 106 is the processor that is storing and executing the software that is being developed or tested using developer board 102. Board controller 108 controls the functions of developer board 102, including power management, I/O ports and peripherals, bus management, memory management and any other functions that are related to development board 102. Board controller 108 can execute operating system code for performing the various developer board functions. Digital ports 110a, 110b provide a digital interface to developer board 102 to various digital devices and peripherals. Analog port 114 provides an analog interface to developer board 102 for various analog devices and peripherals. Programming port 116 provides an interface to developer board 102 that allows another computing device to load program code into development board 102 for execution by target processor 106. Serial port 118 provides a serial communications interface (e.g., USB) to developer board 102. General purpose I/O (GPIO) port provides a general interface port to development board 102 for external devices and peripherals. Touch slider interface 122 provides an interface to developer board 102 for touch slider input. Other development boards may include more or fewer components.

Sensor board 104 can include interface 124 for interfacing with developer board 102. Sensor board 104 includes sensors 126a-126c. Sensors 126 can be any combination of sensor devices selected by the developer. Sensors 126a-126b can be inertial sensors, where sensor 126a is an accelerometer, sensor 126b is a gyro sensor, and sensor 126c is a magnetometer. Some sensor boards may include environment sensors, including temperature sensors, pressure sensors and light sensors. Still other sensor boards may include a combination of inertial sensors and environment sensors.

Each of these sensor devices can be integrated circuit chips provided by different manufacturers. Multiple sensors can be provided in single integrated circuit package (e.g., accelerometer and gyro combination). Each sensor device can provides raw sensor data through a dedicated software driver developed for that particular sensor. The dedicated software driver provides a low-level API for allowing the user to request raw sensor data. Application program code can access these software drivers through a high-level API that provides abstractions for the software drivers, thus adding a layer of transparency to the software drivers. This additional level of transparency can simplify the development of the application program code by reducing the amount of knowledge the developer needs about the software drivers to interface with the sensors. With the high-level API no sensor-specific code is required for the application. Using the high-level API, applications can be used with different hardware platforms with no source code modification. The high-level API is discussed in more detail in reference to FIG. 2.

Figure 2:
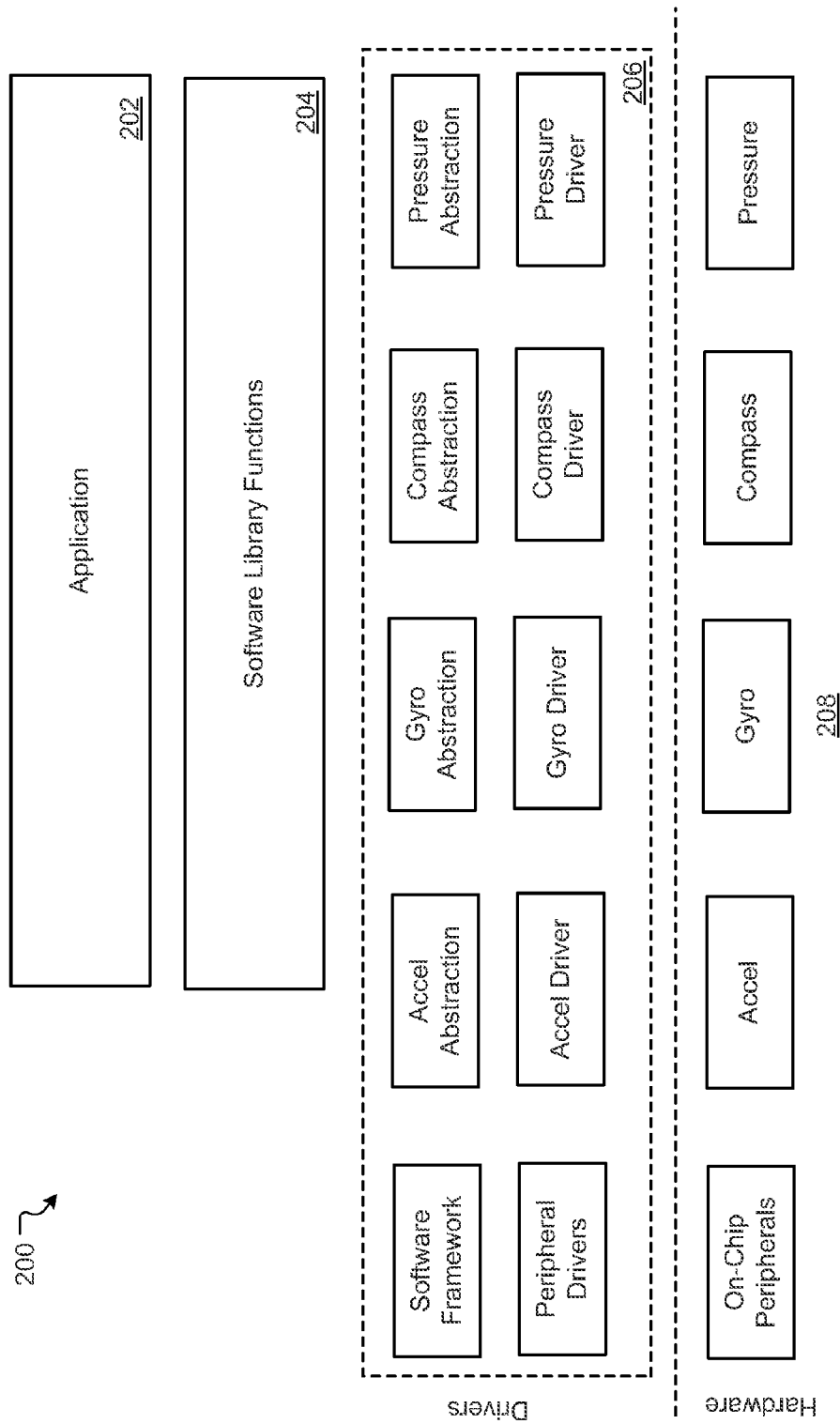
FIG. 2 illustrates exemplary software architecture for developing software using the software development system of FIG. 1.

FIG. 2 illustrates exemplary software architecture 200 for developing software using the software development system of FIG. 1. In some implementations, software architecture 200 can conceptually include an application layer 202, software library layer 204 and driver layer 206. Driver layer 204 directly interfaces with hardware 208, which includes the sensor devices on sensor board 104. Software architecture 200 represents a conceptual hierarchy or "software stack" for which API function calls and API function call returns can traverse. For example, an application program that needs compass heading can make the API function call to a software library function for computing compass heading. The software library function can be associated with definitions and declarations for defining data structures for returning API function call results. An API function call can include a parameter list that provides variables or pointers for sending and receiving data and pointers to and from the underlying software library code for performing the compass heading calculation. The software library code can utilize low-level APIs provided by the sensor manufacturers to access raw data stored in data registers in the sensor devices. These low-level APIs are transparent to the application developer due to the high-level API abstractions.

In the example architecture 200, there is a mix of inertial and environmental sensors in hardware 208. This results in drivers and API abstractions in driver layer 206 for each of the sensors as shown in FIG. 2. Software library functions in software library function layer 204 will access the software drivers using the API abstractions. Some examples of software library functions can be scaling, unit conversion, mathematical calculations or algorithms or any other desired function that can be beneficial to an application. The sensors shown in FIG. 2 are not an exhaustive list and other types of sensors can be supported in a similar manner.

In some implementations, a software framework can be provided in driver layer 206. Software framework is an abstraction that includes common code for providing generic functionality which can be selectively overridden or specialized by user code, thus providing specific functionality. The software framework can include reusable abstractions of code wrapped in the API, and may contain distinguishing features that separate them from other software library functions.

Figure 3:
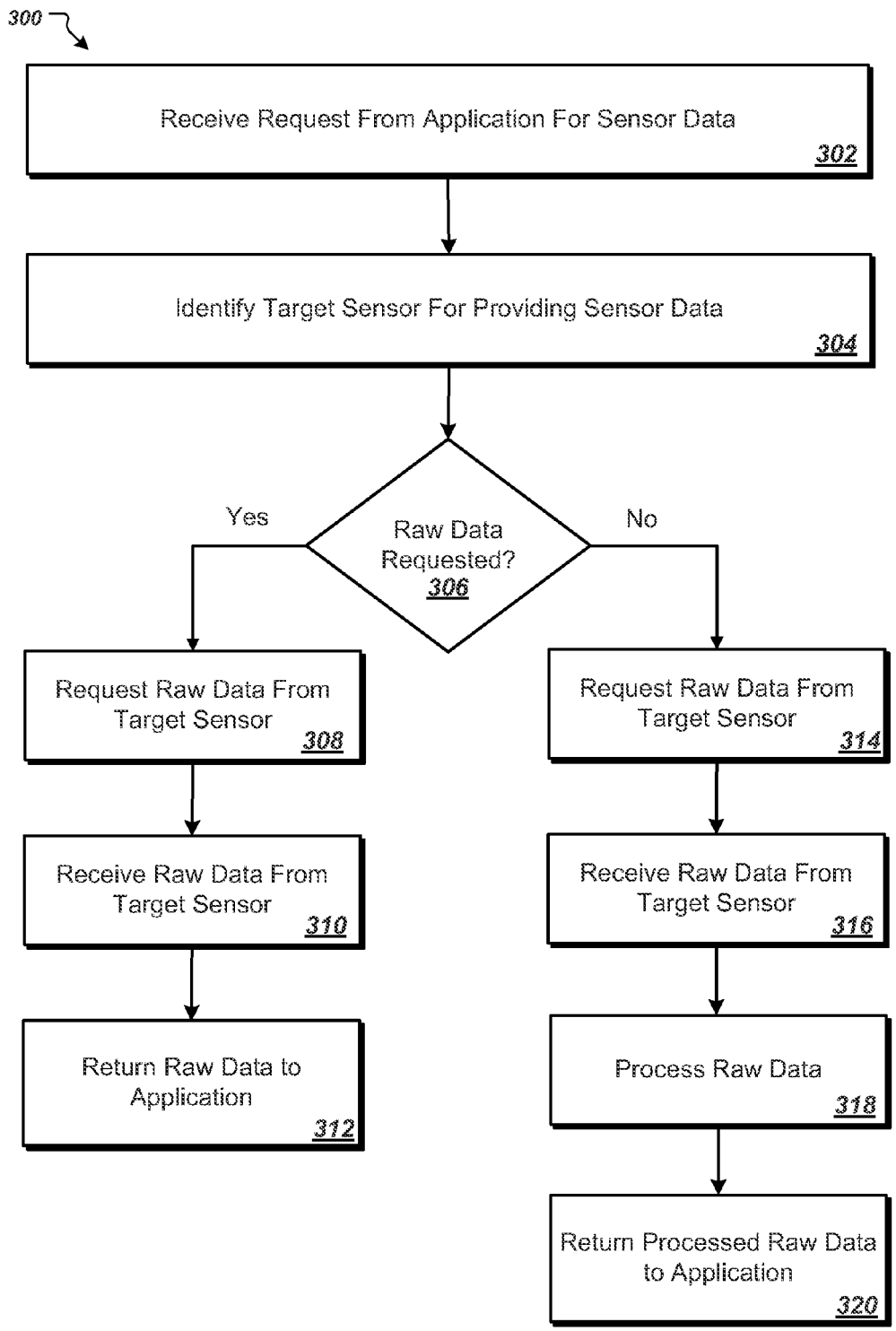
FIG. 3 is a flow diagram of an exemplary process for requesting sensor data using the software architecture of FIG. 2.

FIG. 3 is a flow diagram of an exemplary process 300 for requesting sensor data using the software architecture of FIG. 2. In some implementations, process 300 can begin when a request is received from an application for sensor data (302). Such a request may be initiated based on a programmed time period, conditions identified by the application, or in response to interrupts or other asynchronous events including those generated by the sensor device itself. The request can be made from an application program through an API call. The API code can be implemented in "C" programming language or any other suitable language. Structure definitions can use "C" unions to allow "aliases" of data fields for different classes of data. A timestamp field can be automatically filled in with a value (e.g., a micro-second value) from a real-time clock.

Process 300 identifies a target sensor for providing sensor data (304). Process 300 checks to see if raw sensor data was requested (306). If raw sensor data is requested, process 300 requests the raw sensor data from the target sensor (308), receives the raw data from the target sensor (310), and returns the raw sensor data to the calling application (312). If raw sensor data is not requested, process 300 requests the raw data from the target sensor (314), receives the raw sensor data from the target sensor (316), processes the raw data (318), and returns the processed raw sensor data to the calling application (320). Processing raw data (318) can include data scaling, conversion or calculating mathematical formulas or algorithms using the raw data.

Using the high-level API, an acceleration reading sequence can have the following form:

```
#include "sensor.h"
sensor_t accel_dev;         // accelerometer device descriptor
vector_data_t accel_data;   // acceleration data from device
sensor_attach (&accel_dev, SENSOR_TYPE_ACCELEROMETER, 0, 0);
accel_data.scaled = true;   // read values in milli-g's
sensor_get_acceleration (&accel_dev, &accel_data);
app_x_value = accel_data.axis.x;   // 3-axis acceleration data in user application
app_y_value=accel_data.axis.y;
app_z_value=accel_data.axis.z;
app_read_time = accel_data.timestamp.   //timestamp in microseconds
```

In this example, the API call sensor_attach ( ) and the sensor descriptor accel_dev can be used to identify the accelerometer as the target sensor. Raw accelerometer data can be requested by the calling application program by setting accel_data.scaled=true. This will result in raw acceleration data in milli-g's to be returned to the calling application program. The API function call sensor_get_acceleration ( ) can be used to get the acceleration data and return the acceleration data in the three fields of the accel_data structure.

The API can use two basic structured data types to return sensor data. The first data type is vector_data_t. This data type can be used for 3-axis sensing devices (e.g., accelerometer, gyro) or other readings that return three values (e.g., compass heading). The three values can be returned in three separate data fields (e.g., 32-bit signed integers). The second data type is scalar_t. This data type can be used to return one-dimensional measurements (e.g., temperature, pressure).

Other sensors have a similar reading sequence. For example, a gyro sensor can have a reading sequence in the following form:

```
#include "sensor.h"
sensor_t gyro_dev;         // gyro device descriptor
vector_data_t gyro_data;   // rotation data from device
sensor_attach (&gyro_dev, SENSOR_TYPE_GYROSCOPE, 0, 0);
gyro_data.scaled = true;   // read values in milli-g's
sensor_get_gyro (&gyro_dev, &gyro_data);
app_x_value = gyro data.axis.x;   //3-axis gyro data in user application
app_y_value=gyro_data.axis.y;
app_z_value=gyro_data.axis.z;
app_read_time = gyro_data.timestamp.   //timestamp in microseconds
```

Many sensor devices can provide temperature data as a secondary output value. The temperature data can be used internally in the device for temperature compensation. An exemplary temperature reading sequence for a gyroscope can have the following form:

```
#include "sensor.h"
sensor_t gyro_dev;              // gyro device descriptor
scalar_data_t temp_data;        // temperature data from device
sensor_attach (&gyro_dev, SENSOR_TYPE_GYROSCOPE, 0, 0);
temp_data.scaled = true;        // read values in degrees Celsius
sensor_get_temperature (&gyro_dev, &temp_data);
app_temp_value = temperature;            //temperature in user
                                           application
app_read_time = accel_data.timestamp.    //timestamp in microseconds
```

In some implementations, API calls can provide mathematical functions or algorithms. For example, an API call for compass heading involves gathering 3-axis magnetic sensor measurements X, Y, Z, and using an accelerometer gravitational acceleration to measure tilt angles roll (θ) and pitch (Φ). The X and Y magnetic sensor measurements can be rotated into a horizontal level plane defined by vectors $X_H$ and $Y_H$ using equations [1] and [2]:

$$X_H = X*\cos(\Phi) + Y*\sin(\theta)*\sin(\Phi) - Z\cos(\theta)\sin(\Phi), \quad [1]$$

$$Y_H = Y*\cos(\theta) + Z*\sin(\theta). \quad [2]$$

Azimuth can be computed from equations [1] and [2] using equation [3]:

$$\text{Azimuth} = \tan^{-1}\left(\frac{Y_H}{X_H}\right). \quad [3]$$

A magnetic heading calculation sequence can have the following form:

```
#include "sensor.h"
sensor_t compass_dev;           // compass device descriptor
vector_data_t temp_data;        // heading data from device
sensor_attach (&compass_dev, SENSOR_TYPE_COMPASS, 0, 0);
compass_data.scaled = true;     // read values in degrees and microTesla
sensor_get_heading (&compass_dev, &compass_data);
app_heading = compass_data.field.heading;        //0 to 360 deg in
                                                   user application
app_inclination = compass_data.field.inclination; //-90 to 90 deg in
                                                   user application
app_field_strength = compass_data.field.strength  // micro Tesla
app_read_time = compass_data.timestamp;          //timestamp in
                                                   microseconds
```

Figure 4:
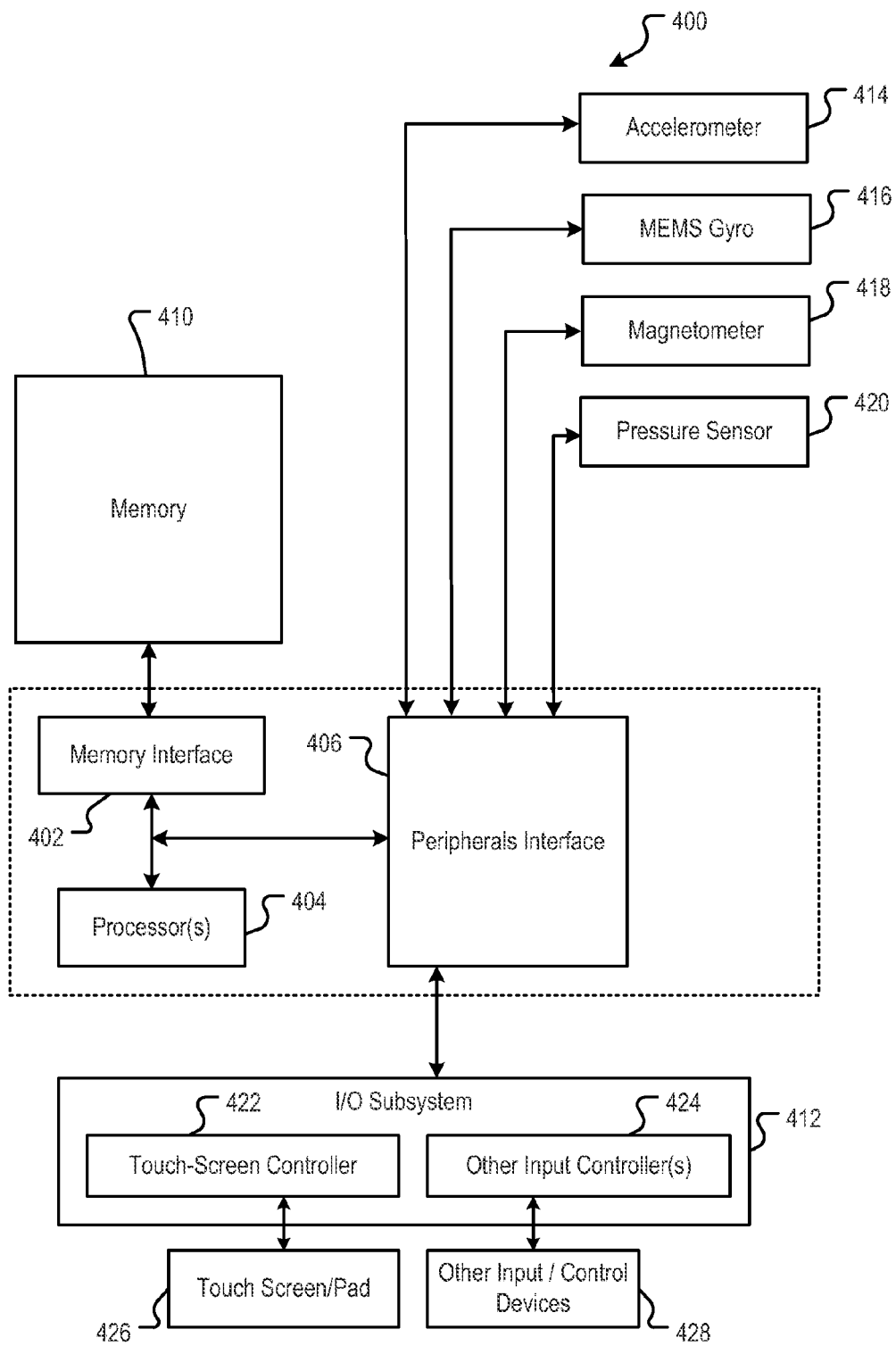
FIG. 4 is a block diagram of an exemplary multi-sensor system for storing and executing software developed by the software development system of FIG. 1 and that uses the software architecture of FIG. 2.

FIG. 4 is a block diagram of an exemplary multi-sensor system 400 for storing and executing software developed by the software development system of FIG. 1 and that uses the software architecture of FIG. 2. In some implementations, system 400 can include memory interface 402, one or more processors 404, peripherals interface 406, memory 410, I/O subsystem 412, accelerometer 414, MEMS gyro 416, magnetometer 418 and pressure sensor 420. I/O subsystem 412 includes touch controller 422 coupled with touch screen/pad 426 and other input controllers 424 coupled to other input/control devices (e.g., switches). Software developed for sensors 414, 416, 418 and 420 can be stored in memory 410 and executed by processor(s) 404 to provide sensor data to one or more applications also stored in memory 410 and executed by processor(s) 402.

While this document contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

What is claimed is:

1. A software development system, comprising:
  a development board including an interface and a target processor;
  a sensor board coupled to the development board through the interface, the sensor board including multiple sensors;
  memory storing application program code and a software library, which, when executed by the target processor, causes the target processor to perform the operations comprising:
    receiving a request from the application program for sensor data;
    identifying a sensor of the multiple sensors for providing the requested sensor data;
    identifying a dedicated driver in a driver layer for the identified sensor;
    determining whether the application program is requesting raw or processed sensor data;
    if the application program is requesting processed sensor data:
      requesting raw sensor data from the identified driver;
      receiving the requested raw sensor data from the identified driver;
      sending the raw sensor data to a function of the software library;
      processing, by the function of the software library, the raw sensor data to generate the requested processed sensor data; and
      providing the processed sensor data to the application program; and
    if the application program is requesting raw sensor data:
      requesting raw sensor data from the identified driver; and
      providing the raw sensor data to the application program.

2. The system of claim 1, where the sensor is from a group of sensors including accelerometers, gyro sensors, magnetometers, temperature sensors, pressure sensors, light sensors, proximity sensors, and touch sensors.

3. The system of claim 1, where the software library function is associated with definitions or declarations for defining data structures for returning the raw sensor data.

4. The system of claim 1, where the software library function includes a parameter list that provides variables or pointers for sending and receiving data and pointers to and from code of the software library function for generating the processed sensor data.

5. The system of claim 1, where the software library function utilizes an application programming interfaces (API) provided by the sensor driver in the driver layer to access the raw sensor data stored in one or more registers in the sensor.

6. The system of claim 1, where the software library function includes code for performing at least one of scaling, unit conversion and mathematical calculations on the raw sensor data.

7. The system of claim 1, where the driver layer includes a software framework, where the software framework is an abstraction that includes common code for providing generic functionality, which can be selectively overridden or specialized by user code to provide specific functionality.

8. A method performed by a software development system including a development board including an interface, a target processor and a sensor board coupled to the development board through the interface, the sensor board including multiple sensors, the method comprising:
  receiving a request from the application program for sensor data;
  identifying a sensor of the multiple sensors for providing the requested sensor data;
  identifying a dedicated driver in a driver layer for the identified sensor;
  determining whether the application program is requesting raw or processed sensor data;
  if the application program is requesting processed sensor data:
    requesting raw sensor data from the identified driver;
    receiving the requested raw sensor data from the identified driver;
    sending the raw sensor data to a function of the software library;
    processing, by the function of the software library, the raw sensor data to generate the requested processed sensor data; and
    providing the processed sensor data to the application program; and if the application program is requesting raw sensor data:
    requesting raw sensor data from the identified driver; and
    providing the raw sensor data to the application program.

9. The method of claim 8, where the sensor is from a group of sensors including accelerometers, gyro sensors, magnetometers, temperature sensors, pressure sensors, light sensors, proximity sensors, and touch sensors.

10. The method of claim 8, where the software library function is associated with definitions or declarations for defining data structures for returning the raw sensor data.

11. The method of claim 8, where the software library function includes a parameter list that provides variables or pointers for sending and receiving data and pointers to and from code of the software library function for generating the processed sensor data.

12. The method of claim 8, where the software library function utilizes an application programming interfaces (API) provided by the sensor driver in the driver layer to access the raw sensor data stored in one or more registers in the sensor.

13. The method of claim 8, where the software library function includes code for performing at least one of scaling, unit conversion and mathematical calculations on the raw sensor data.

14. The method of claim 8, where the driver layer includes a software framework, where the software framework is an abstraction that includes common code for providing generic functionality, which can be selectively overridden or specialized by user code to provide specific functionality.

* * * * *